United States Patent [19]
Schmidt

[11] Patent Number: 5,845,983
[45] Date of Patent: Dec. 8, 1998

[54] VEHICLE LIGHT MOUNTING SYSTEM

[76] Inventor: John M. Schmidt, 1991 Severn Rd., Grosse Pointe Woods, Mich. 48236

[21] Appl. No.: 889,214

[22] Filed: Jul. 8, 1997

Related U.S. Application Data

[60] Provisional application No. 60/021,258 Jul. 10, 1996.

[51] Int. Cl.[6] ........................................ B60Q 1/02
[52] U.S. Cl. ...................... 362/82; 362/80; 362/249
[58] Field of Search ........................... 362/80, 82, 83.3, 362/249

[56] References Cited

U.S. PATENT DOCUMENTS

| | | |
|---|---|---|
| D. 314,636 | 2/1991 | Iacovelli . |
| D. 317,428 | 6/1991 | Carr . |
| 2,142,069 | 12/1938 | Colley . |
| 2,239,015 | 7/1941 | Powell ........................................ 362/82 |
| 2,269,822 | 1/1942 | Kowalsky . |
| 3,590,236 | 6/1971 | Ussery ........................................ 362/82 |
| 4,168,855 | 9/1979 | Koch . |
| 4,264,093 | 4/1981 | Long . |
| 4,955,577 | 9/1990 | Ching . |

FOREIGN PATENT DOCUMENTS

| | | | |
|---|---|---|---|
| 110320 | 8/1928 | Germany | .................................. 362/82 |
| 521396 | 7/1953 | Germany | .................................. 362/82 |

*Primary Examiner*—Thomas M. Sember
*Attorney, Agent, or Firm*—Harness, Dickey & Pierce, P.L.C.

[57] ABSTRACT

A light mounting system for a motor vehicle. The system includes a tubular light mounting member, and a vehicle light mount bracket that extends from the mounting member and that receives a vehicle light mounted thereto. A bumper mount bracket extends from the light mount member and facilitates mounting of the member to a vehicle bumper mount. The mounting member extends generally upwardly and inwardly from the vehicle bumper mount to minimize exposure of the mounting member to bumper contact forces, and to allow the vehicle lights to be mounted in close proximity to the vehicle driving surface to provide maximum illumination of the driving surface.

16 Claims, 3 Drawing Sheets

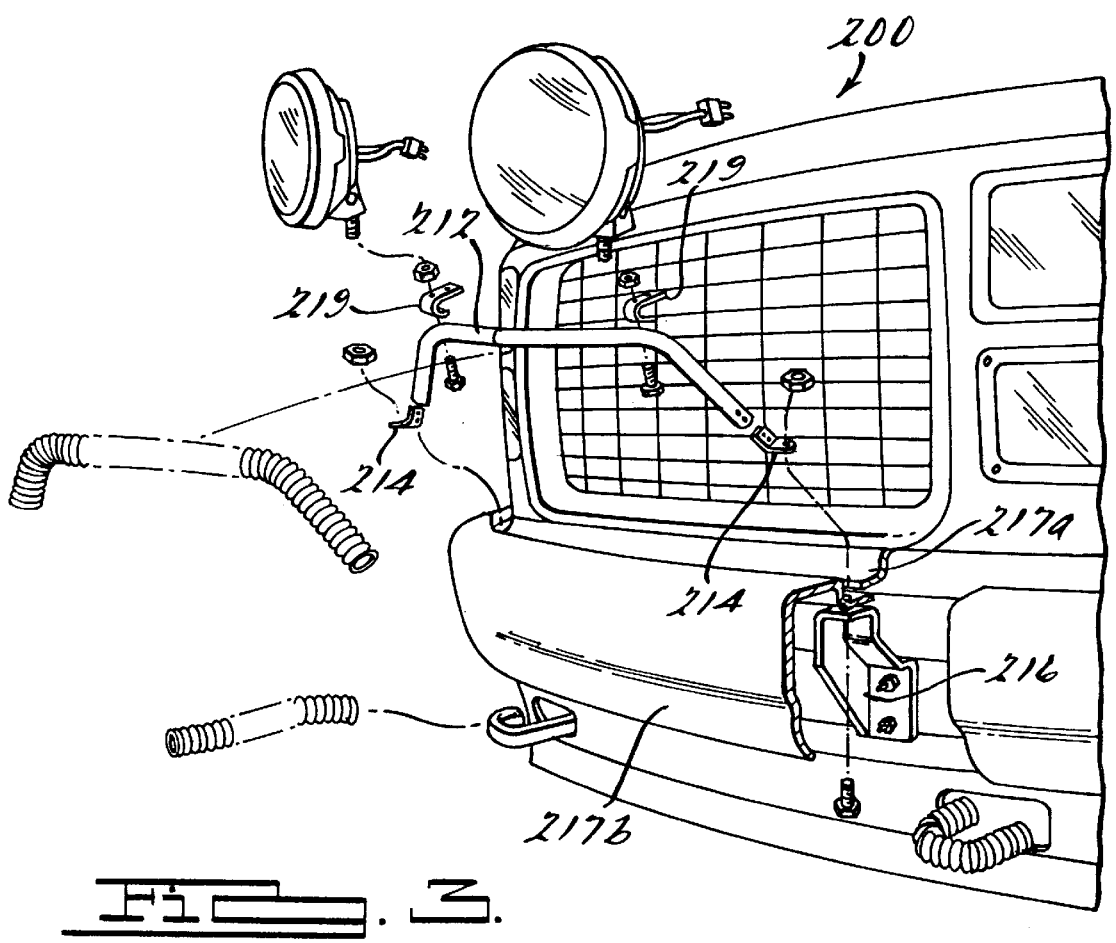
FIG. 3.
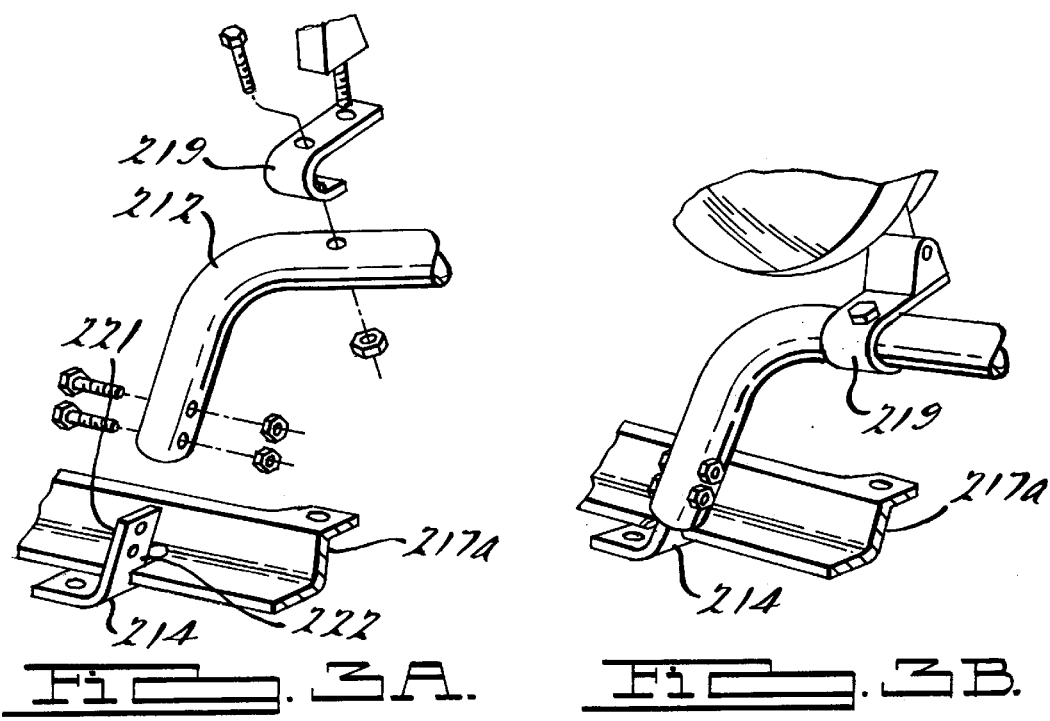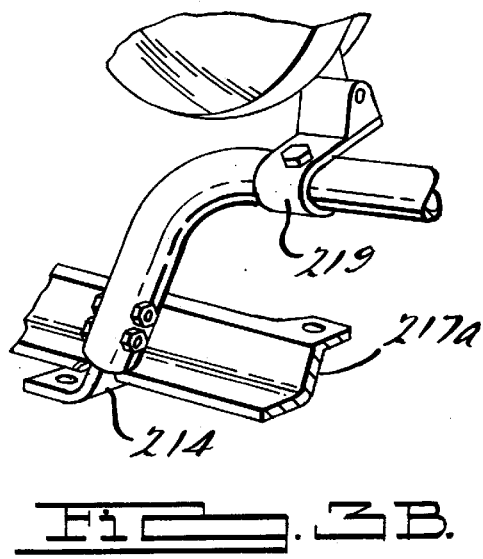
FIG. 3A.  FIG. 3B.

VEHICLE LIGHT MOUNTING SYSTEM

CROSS-REFERENCE TO RELATED APPLICATION

This application is based upon and claims priority to U.S. provisional patent application Ser. No. 60/021,258 filed Jul. 10, 1996, and entitled Vehicle Light Mounting System, the specification and drawings of which are herein expressly incorporated by reference.

BACKGROUND OF THE INVENTION

Vehicle driving lights are frequently added to vehicles such as pickup trucks and sport utility vehicles to supplement the vehicle's regular headlights. The vehicle driving lights enhance the driver's road awareness in low visibility weather conditions, such as fog and rain.

Often the driving lights are mounted above the vehicle passenger cab. However, lights thus mounted are removed an additional distance from the road with respect to the vehicle regular headlights. Thus, the power of the lights must be increased to compensate for the added distance. In addition, passenger cab mounted vehicle driving lights increase the clearance required for the vehicle. Such placement also increases the likelihood of light breakage due to damaging impact forces.

The driving lights also are often mounted below the vehicle front bumper. However, such bumper mounted driving lights decrease the vehicle bottom clearance and are susceptible to breakage due to the placement of these lights in close proximity with the road.

What is needed then is a mounting system for vehicle driving lights that does not adversely affect vehicle clearance requirements, and that minimizes the exposure to potential damage of the lights mounted thereto.

SUMMARY OF THE INVENTION

Accordingly, the present invention provides a light mounting system for a motor vehicle. The system includes a tubular light mounting member, and a vehicle light mount bracket that extends from the mounting member and that receives a vehicle light mounted thereto. A bumper mount bracket extends from the light mount member and facilitates mounting of the member to a vehicle bumper mount. The mounting member extends generally upwardly and inwardly from the vehicle bumper mount to minimize exposure of the mounting member to bumper contact forces, and to allow the vehicle light to be mounted in close proximity to the vehicle driving surface to provide maximum illumination of the driving surface. In a preferred embodiment of the present invention, a protective sheathing is placed over the light mount member to protect the light mount member from insects and other damaging elements.

BRIEF DESCRIPTION OF THE DRAWINGS

FIG. 3 is an exploded perspective view of a vehicle driving light mounting system according to a third preferred embodiment of the present invention.

FIGS. 3A and 3B are isolated views of the mounting brackets of the system of FIG. 3.

FIG. 4 is an isolated view of a mounting bracket for a vehicle light mounting system according to a fourth preferred embodiment of the present invention.

DETAILED DESCRIPTION OF THE PREFERRED EMBODIMENT

Figure 1:
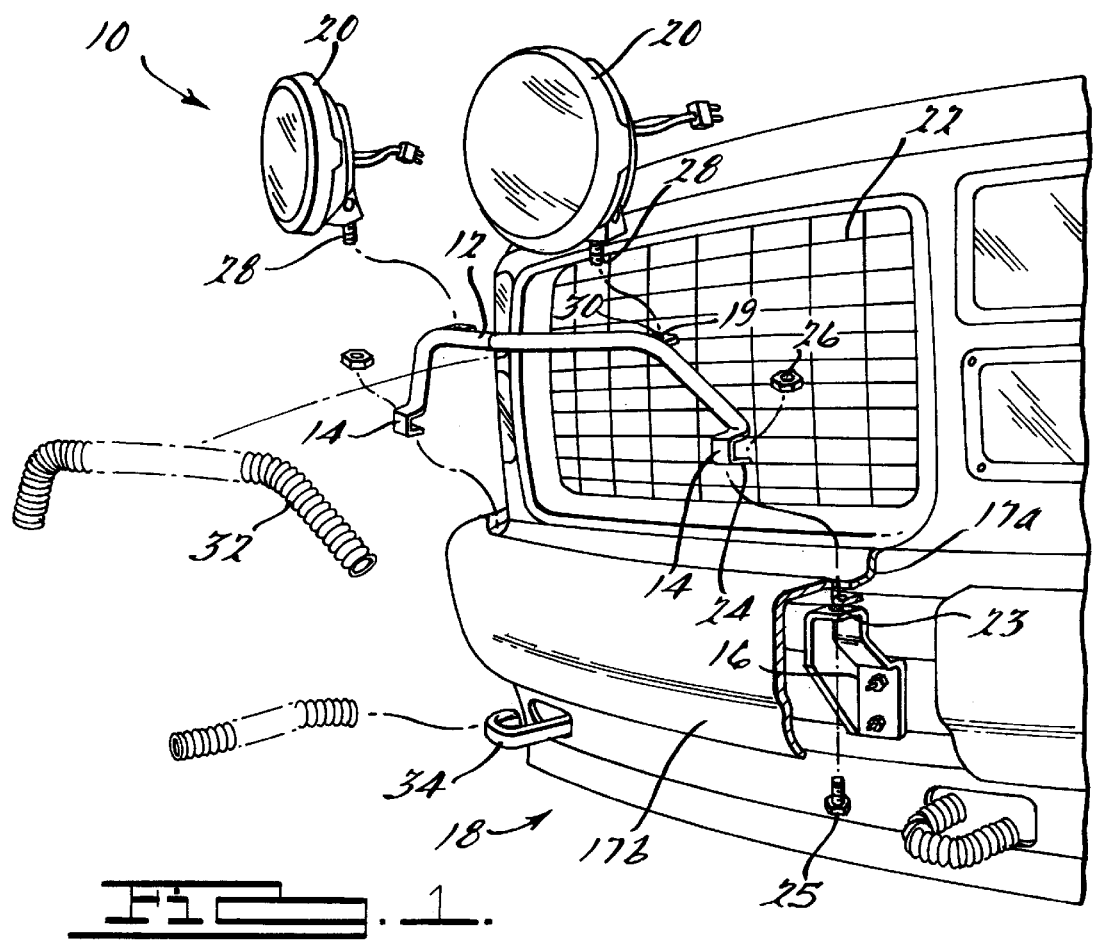
FIG. 1 is an exploded perspective view of a vehicle driving light mounting system according to a first preferred embodiment of the present invention.

Referring now to the drawings, FIG. 1 shows a vehicle driving light mounting system according to a first preferred embodiment of the present invention generally at 10. The system includes a mounting tube 12 including integral mounting brackets 14 at each end thereof. The mounting brackets conform to the contour of a visible bumper urethane trim piece 17a and are secured between visible bumper urethane trim pieces 17a, 17b and to vehicle bumper mounts 16 located beneath visible bumper urethane trim piece 17b. The tube, which is preferably formed from tubular steel, aluminum or other lightweight durable material, also includes light mounting brackets 19 for mounting vehicle driving lights 20 thereto. The tube is formed so as to extend upwardly from the vehicle bumper in a recessed manner in front of the vehicle grill 22. Therefore, the tube 12 is guarded from bumper impact forces. The mounting tube therefore allows the driving lights 20 to be mounted in close proximity with the road without altering vehicle clearance. The tube also minimizes the exposure of the lights and tube to bumper impact forces.

Figures 1A, 2:
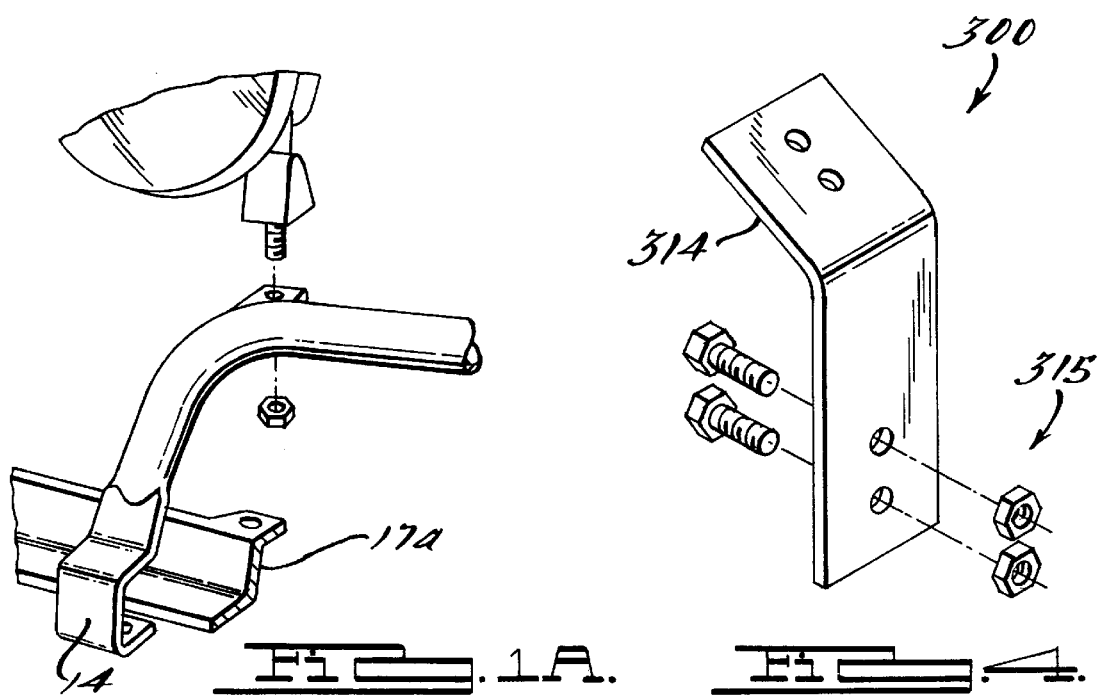
FIG. 1A is an isolated view of the mounting brackets of the system of FIG. 1.
FIG. 2 is an exploded perspective view of a vehicle driving light mounting system according to a second preferred embodiment of the present invention.

Referring to FIGS. 1 and 1A, mounting of the tube 12 to the vehicle bumper mounts 16 will now be described in more detail. Apertures 23 formed in the upper mounting surfaces of the bumper mounts 16 are each aligned with an aperture 24 formed in each of the mounting brackets 14. The tube is then secured to the bumper mounts 16 via a conventional fastener, such as a bolt 24 and nut 26, in threadible fashion. The tube is thus secured to the bumper mounts 16 without structurally altering the outer trim 17.

In addition, the driving lights 20 are secured to the integral light mounting brackets 19 through insertion of light mounting posts 28 through apertures 30 in the mounting brackets 19, and securing of the posts to the brackets through conventional fastener mechanisms.

Once the light mounting tube 12 has been secured to the bumper mounts 16, a protective sheathing, such as that shown at 32, may be placed over the tube 12 to protect the tube from weather elements and from insects. In addition, a protective sheathing may also be placed over vehicle tow bars 34 extending outwardly from the vehicle frame. It should be appreciated that this protective sheathing may be ribbed PVC tubing, non-ribbed PVC tubing, or any other protective durable sheathing capable of being placed over the light tubes.

The sheathing is preferably of a color that is complementary to the vehicle or bumper color. However, the sheathing may be of any color according to the vehicle owner's preference.

Figure 2:
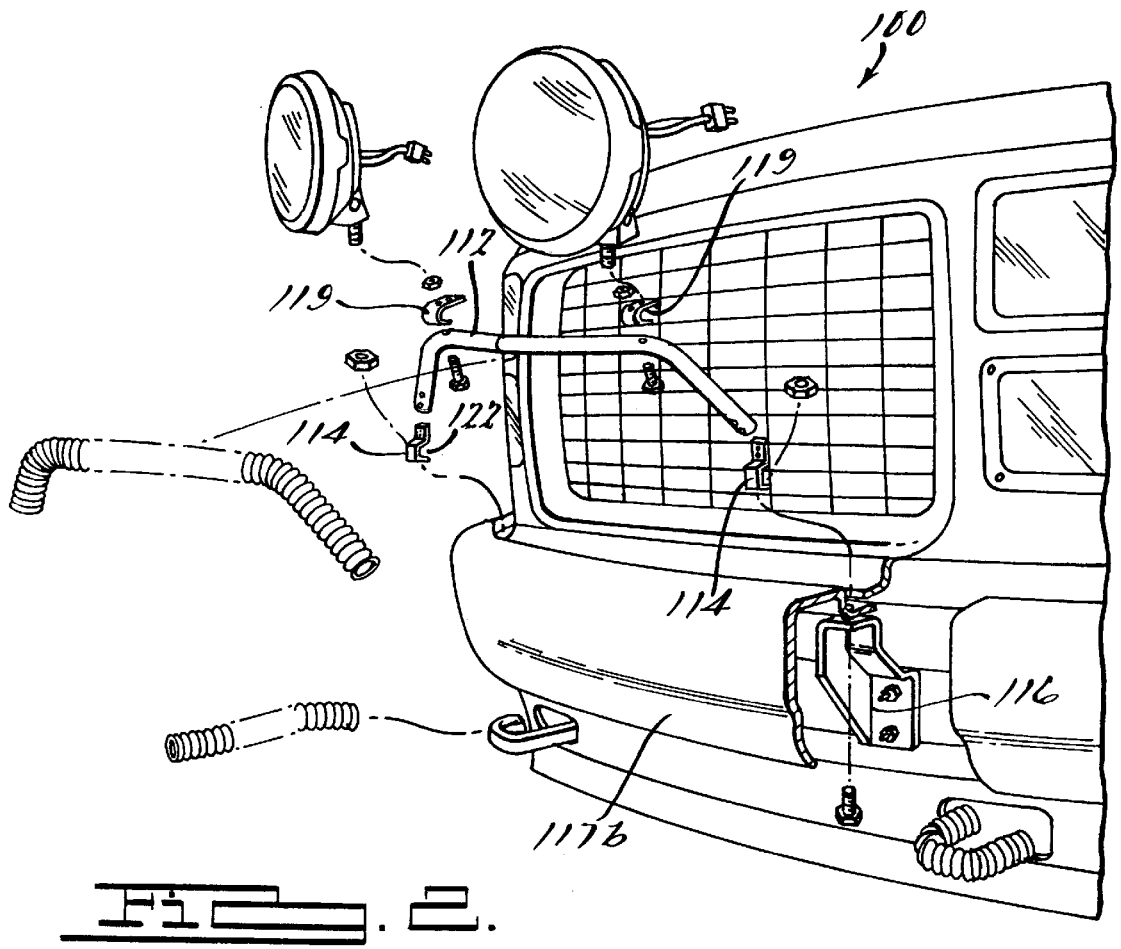
Figures 2A, 2B:
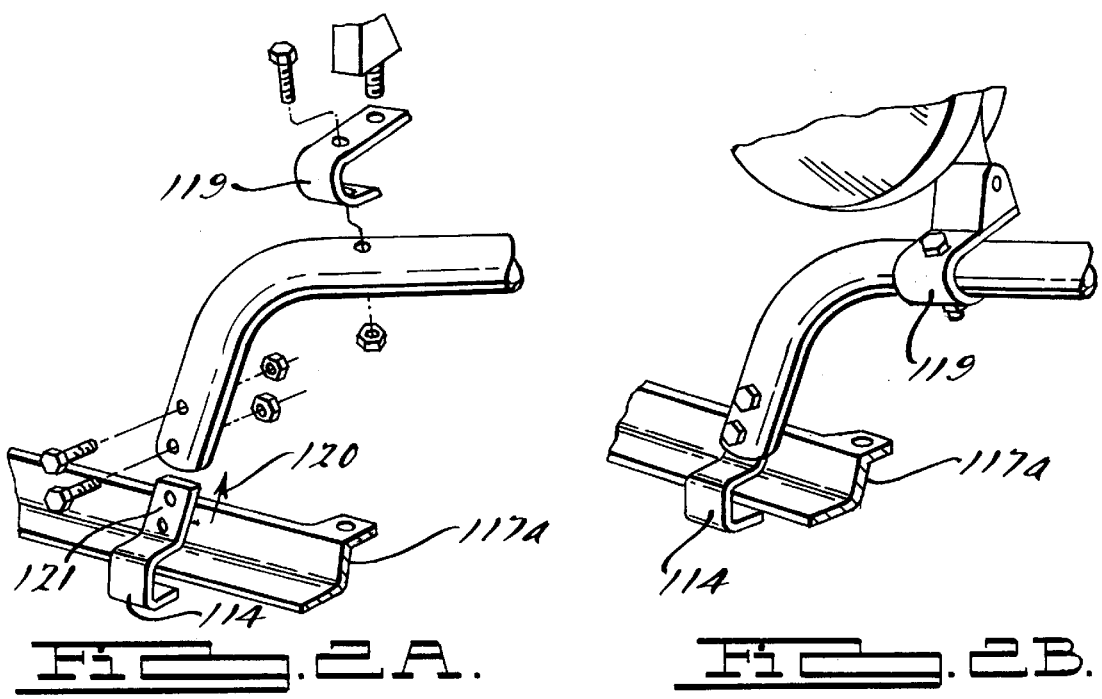
FIGS. 2A and 2B are isolated views of the mounting brackets of the system of FIG. 2.

Referring now to FIGS. 2 and 2A–2B, a second preferred embodiment of the light mounting system of the present invention is shown generally at 100. The system 100 is similar to the system 10 with the exception that the tube mounting brackets 114 and the light mounting brackets 119 are not integrally formed with the tube 112. As shown in the rear views of FIGS. 2A and 2B, the brackets 114, 119 are assembled to the tube using conventional nut/bolt fastening combinations through mounting bores 120 that extend from a front surface 121 of each of the tubes to a rear surface 122 of each of the tubes. Once the tube mounting bracket 114 is secured to the tube 112, it is fastened to the bumper mount 116 between bumper trim pieces 117a, 117b in a manner similar to that of the mounting bracket 14 shown in FIG. 1.

Referring now to FIG. 3, a third preferred embodiment of the present invention is shown generally at 200. The system 200 is similar to the system 100, with the exception of the structure of the mounting brackets 214. As shown in FIGS. 3A and 3B, the mounting brackets 214 are secured to the tube 212 through mounting bores 220 that extend from a first side 221 of each of the brackets to a second side 222 of each of the brackets. Due to the configuration of the brackets 214, a slot is formed in the bumper urethane trim piece 217a, thereby allowing mounting of the bracket 114 to the bumper mount 216.

Referring now to FIG. 4, a fourth preferred embodiment of the present invention is shown generally at 300. As shown, the tube mounting bracket 314 is configured to be secured to a bumper mount (not shown) having horizontally oriented mounting bores through a horizontally connecting nut and bolt combination 315, as opposed to a vertically connecting nut and bolt combination shown in FIGS. 1–3. Thus, it should be appreciated that the tube mounting configurations may be altered to conform to the particular bumper mount configuration, thereby allowing the driving light mounting system of the present invention to be utilized in a wide variety of motor vehicles having varying bumper and bumper mount structures.

Therefore, it should be appreciated that the driving light of the mounting system of the present invention may be added as a feature during initial vehicle assembly and manufacture, or may be sold as an aftermarket product due to its minimal assembly requirements. The light mounting system of the present invention provides an effective system for mounting driving lights at a desirable location for maximum driving light effectiveness, while minimizing the exposure of the light mounting system to undesirable impact forces typically absorbed by a vehicle bumper.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A light mounting system for a motor vehicle comprising:
    a tubular light mount including first and second ends and a body portion;
    first and second bumper brackets extending from said first and second tubular light mount ends for securing said tubular light mount to a vehicle bumper; and
    first and second light brackets for securing first and second lights to said tubular light mount;
    said tubular light mount extending upwardly and inwardly from said bumper to minimize exposure of said tubular light mount to impact forces exerted on said bumper.

2. The light mounting system of claim 1, wherein said first and second bumper brackets are shaped to conform to the vehicle bumper to minimize modification of the bumper for mounting of the brackets thereto.

3. The light mounting system of claim 1, wherein said first and second bumper brackets are formed integrally with said tubular light mount.

4. The light mounting system of claim 1, wherein said first and second bumper brackets are secured to said tubular light mount via a fastening mechanism.

5. The light mounting system of claim 1, wherein said first and second bumper brackets include mounting bores defined from a bracket front mounting surface through a bracket rear mounting surface to facilitate mounting of the light mount to the vehicle bumper.

6. The light mounting system of claim 1, wherein said first and second bumper brackets include mounting bores defined from a first bracket side mounting surface through a second bracket side mounting surface to facilitate mounting of the light mount to the vehicle bumper.

7. The light mounting system of claim 1, wherein said first and second light brackets are integrally formed with said light mount.

8. The light mounting system of claim 1, wherein said first and second light brackets are secured to said light mount via first and second fastening mechanisms, respectively.

9. The light mounting system of claim 1, wherein said light mount is of a single piece construction.

10. The light mounting system of claim 1, further comprising a protective sheathing that covers said light mount.

11. The light mounting system of claim 10, wherein said protective sheathing comprises PVC tubing.

12. A vehicle light bar, comprising:
    a tubular light mounting member having first and second ends;
    a vehicle light mount bracket that extends from the mounting member and that receives a vehicle light mounted thereto;
    a bumper mount bracket that extends from the ends of the light mount member and that facilitates mounting of the member to a bumper mount of a vehicle bumper;
    the mounting member extending generally upwardly and inwardly from the vehicle bumper mount to minimize exposure of the mounting member to bumper contact forces.

13. The vehicle light bar of claim 12, wherein the bumper mount bracket is configured to facilitate mounting of the mounting member to the vehicle bumper mount with minimal modification of the vehicle bumper.

14. The vehicle light bar of claim 12, further comprising a protective sheathing that fits over the light bar.

15. The vehicle light bar of claim 12, wherein the bumper mount bracket is integrally formed with the light bar.

16. The vehicle light bar of claim 12, wherein the bumper mount bracket is connected to the light bar via a fastening mechanism.

* * * * *

UNITED STATES PATENT AND TRADEMARK OFFICE
CERTIFICATE OF CORRECTION

PATENT NO. : 5,845,983

DATED : December 8, 1998

INVENTOR(S) : Schmidt

It is certified that error appears in the above-identified patent and that said Letters Patent is hereby corrected as shown below:

Column 2, line 38, change "24" to --25--.

Signed and Sealed this

Ninth Day of March, 1999

Attest:

Q. TODD DICKINSON

*Attesting Officer*     *Acting Commissioner of Patents and Trademarks*